(12) United States Patent
Saukaitis

(10) Patent No.: US 8,876,949 B2
(45) Date of Patent: *Nov. 4, 2014

(54) METHOD OF PREPARING A PALLADIUM-SILVER ALLOY GAS SEPARATION MEMBRANE SYSTEM

(71) Applicant: Shell Oil Company, Houston, TX (US)

(72) Inventor: John Charles Saukaitis, Katy, TX (US)

(73) Assignee: Shell Oil Company, Houston, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/718,818

(22) Filed: Dec. 18, 2012

(65) Prior Publication Data

US 2013/0152785 A1 Jun. 20, 2013

Related U.S. Application Data

(60) Provisional application No. 61/577,761, filed on Dec. 20, 2011.

(51) Int. Cl.

| | | |
|---|---|---|
| *B01D 53/22* | (2006.01) | |
| *B01D 71/02* | (2006.01) | |
| *B01D 67/00* | (2006.01) | |
| *B01D 69/12* | (2006.01) | |
| *C23C 18/16* | (2006.01) | |
| *C23C 18/18* | (2006.01) | |
| *C23C 18/42* | (2006.01) | |
| *C01B 3/50* | (2006.01) | |
| *C23C 18/48* | (2006.01) | |

(52) U.S. Cl.
CPC .......... *B01D 67/0076* (2013.01); *B01D 53/228* (2013.01); *B01D 67/0055* (2013.01); *B01D 71/022* (2013.01); *C23C 18/1651* (2013.01); *C23C 18/1806* (2013.01); *C23C 18/1831* (2013.01); *C23C 18/42* (2013.01); *C23C 18/1692* (2013.01); *C01B 3/505* (2013.01); *C23C 18/1644* (2013.01); *C23C 18/48* (2013.01); *B01D 2257/108* (2013.01); *B01D 2256/16* (2013.01)

USPC ................ 95/56; 96/11; 427/270; 427/383.1; 427/404

(58) Field of Classification Search
USPC ........... 95/45, 55, 56; 96/4, 11; 427/270, 292, 427/331, 383.1, 404; 148/527
See application file for complete search history.

(56) References Cited

U.S. PATENT DOCUMENTS

| | | | | |
|---|---|---|---|---|
| 6,152,987 | A * | 11/2000 | Ma et al. ............................ | 95/56 |
| 7,175,694 | B2 | 2/2007 | Ma et al. ............................ | 95/56 |
| 7,744,675 | B2 | 6/2010 | Saukaitis et al. ................... | 95/55 |
| 2004/0237780 | A1* | 12/2004 | Ma et al. ............................ | 96/11 |
| 2009/0120287 | A1* | 5/2009 | Del Paggio et al. .............. | 95/56 |
| 2011/0232821 | A1 | 9/2011 | Saukaitis et al. ................. | 156/60 |

OTHER PUBLICATIONS

Cha et al.; "The Inhibition of Silver Agglomeration by Gold Activation in Silver Electroless Plating"; Journal of the Electrochemcial Society; pp. C388-C391; 2005.
Lin W. H., et al., "Characterizations of Pd—Ag Membrane Prepared by Sequential Electroless Deposition", Surface & Coatings Technology, Elsevier, Amsterdam, NL, vol. 194, No. 1, Apr. 2005, pp. 157-166.

* cited by examiner

*Primary Examiner* — Jason M Greene
(74) *Attorney, Agent, or Firm* — Charles W. Stewart

(57) ABSTRACT

A method of preparing a palladium-silver alloy gas separation membrane system, wherein the surface of the palladium layer or a silver layer is activated by a non-chemical activation method involving abrasion to a controlled surface roughness and abrasion pattern, thereby permitting the plating or deposition of an overlayer of silver on the palladium layer, silver on a silver layer, or palladium on a silver layer. The palladium and silver layers are preferably supported on a porous metal support to which an intermetallic diffusion barrier has been applied.

15 Claims, No Drawings

US 8,876,949 B2

METHOD OF PREPARING A PALLADIUM-SILVER ALLOY GAS SEPARATION MEMBRANE SYSTEM

The present application claims the benefit of U.S. Provisional Patent Application Ser. No. 61/577,761, filed Dec. 20, 2011, the entire disclosure of which is hereby incorporated by reference.

FIELD OF THE INVENTION

This invention relates to a method of preparing a palladium-silver alloy gas separation membrane system, the gas separation membrane system itself, and the use thereof.

BACKGROUND OF THE INVENTION

Composite gas separation modules are commonly used to selectively separate a particular gas from a gas mixture. These composite gas separation modules may be made of a variety of materials, including, for example, polymers and metallic composites. While these composite gas separation modules can provide effective and cost efficient alternatives for the separation of gases at low temperature process conditions, they often are unsuitable for use in high temperature and pressure gas separation processing.

Certain types of gas separation modules are disclosed in the prior art that are intended for use in high temperature gas separation applications and that have structures consisting of a selective gas permeable metallic membrane mounted on the surface of a porous substrate. For instance, US Patent Publications 2004/0237780 and 2009/0120287 disclose gas separation systems for the selective separation gases. Both teach that the gas separation system is made by first depositing a gas-selective metal by electroless plating which is generally palladium onto a porous substrate followed by abrading the resultant coated substrate and, thereafter, depositing a second layer of a gas-selective metal which is also generally palladium upon the coated polished porous substrate. In US 2004/0237780, the intermediate step of abrading or polishing of the coated substrate is used to remove unfavorable morphologies from the surface of the coated substrate. In US 2009/0120287, the intermediate abrading step is used for the purpose of removing a substantial portion of the first deposited material to provide a thinner dense gas selective membrane. These publications do not address the problems associated with attempting to deposit a layer of silver onto a layer of palladium.

The problem of silver agglomeration is well-known. "The Inhibition of Silver Agglomeration by Gold Activation in Silver Electroless Plating," Cha et al., Journal of the Electrochemical Society (2005), C388-C391, describes silver agglomeration as an obstacle to obtaining thin silver films. A layer of gold was used as an activation material for the substrate and thereafter, silver film was electrolessly deposited on to the gold-activated substrate. Silver has a different crystal structure than palladium and if one tries to plate silver on palladium, the silver will plate on itself and form islands on the surface of the palladium.

Another approach to overcoming the problem of silver agglomeration is to chemically activate the surface to be plated prior to deposition of the silver. One such method of chemical activation is disclosed in U.S. Pat. No. 7,175,694, wherein an oxidized stainless steel tube was surface activated by immersing the tube in aqueous baths of $SnCl_2$ and $PdCl_2$ prior to sequential application of layers of palladium and silver. This method of activation consumes large amounts of water and generates significant volumes of aqueous waste that requires treatment before discharge and also leaves residues of tin and chloride ions, which need to be removed.

Another method of activation of a palladium surface utilizes palladium acetate in chloroform solution and involves evaporation, drying and decomposition of the acetate followed by reduction to palladium metal seeds.

Since chemical activation methods, such as those described above, involve multiple steps, they tend to be expensive and time consuming, in addition to generating waste products which need to be treated.

A non-chemical method for activating the surface of metals is disclosed in U.S. 2011/0232821. However, the disclosed method employs a different surface roughness and morphology than employed in the present inventive method.

Therefore, there is a need in the art for an efficient and cost effective method to prepare a palladium-silver alloy gas separation membrane system in which the silver can be uniformly deposited on a layer of palladium without the need for chemical activation or the need to include a layer of gold as an activating material.

SUMMARY OF THE INVENTION

The present invention provides an inexpensive and highly efficient method to activate the surface of palladium to facilitate the application of a overlayer of silver and/or additional layers of palladium without expensive and time consuming chemical activation.

The present invention is based in part on the discovery that silver can be applied to a palladium surface without the need for time consuming chemical activation techniques, or the need to include a layer of gold by the steps of: Activating the surface of a palladium layer by abrading the surface with an abrasive media to achieve a certain surface roughness and abrasion pattern as hereinafter described; depositing upon the activated palladium layer, without chemical activation, an overlayer comprising silver which is plated over the palladium layer, and; annealing the palladium layer and silver overlayer to provide a palladium-silver alloy gas separation membrane system. The present method can be used to plate silver on the palladium layer, silver on a silver layer, or palladium on a silver layer.

While the polishing or abrading of a palladium surface is known in the art, such polishing or abrading is typically performed in order to produce a smoother palladium surface on which subsequent layers of palladium can be deposited after chemical activation. The abrading step in the present method is primarily performed to activate the surface, e.g., by scratching or otherwise imposing a surface pattern and a controlled surface roughness on the surface that will allow additional plating without chemical activation. Thus, the terms "abrading" or "polishing' as used in describing the present method refers to the application of an abrasive media to a metal membrane surface to activate the surface of the metal membrane to facilitate additional platings without the need for chemical activation.

The present invention also provides a palladium-silver alloy gas separation membrane system, comprising: a porous support upon which is supported a palladium layer which has been activated by using an abrasive media to a certain surface roughness wherein the activated palladium layer is overlaid with an overlayer comprising silver which is plated over the palladium layer, and the combined palladium and silver layers are annealed to form the palladium-silver alloy gas separation membrane system. In a preferred embodiment, the porous support is coated with an intermetallic diffusion barrier on which the palladium and/or silver layers are deposited.

The inventive palladium-silver alloy gas separation membrane system may be used inter alia in a process for the separation of hydrogen from a hydrogen-containing gas stream under conditions of high temperatures and pressures.

DETAILED DESCRIPTION OF THE INVENTION

The invention relates to an economically advantageous method of manufacturing a gas separation membrane system having at least one layer of palladium and at least one layer of silver deposited thereon. The invention also relates to the gas separation membrane system thereby produced, and its use to separate gases.

An important feature of the inventive method is the abrading step in which the surface of a palladium layer is activated by abrading or grinding the surface to impose a suitable abrasion pattern and a controlled surface roughness. It has been found that if the palladium surface is activated as hereinafter described, it is possible to coat the palladium surface with a uniform layer or coating of silver without the need for expensive and time consuming chemical activation or the need to include a layer of gold as an activating material, although one or more layers of gold can be applied to the palladium-silver alloy membrane to improve its sulfur resistance.

In accordance with the invention, in order to coat a relatively smooth palladium surface (which is defined as a palladium surface having a mean surface roughness (Sa) of below 0.8 micron) with a uniform overlayer of silver, the palladium surface is activated by abrasion to achieve a mean surface roughness (Sa) above 0.8 micron up to 2.5 microns, together with a suitable abrasion pattern. Preferably, the mean surface roughness (Sa) is controlled within the range of from 0.85 micron to 1.5 microns, more preferably in the range of from 0.9 micron to 1.2 microns.

Suitable abrasion patterns may be in the form of a lay pattern, which is a repetitive impression on the surface of the palladium. Examples of surface finish lay patterns include vertical, horizontal, radial, cross-hatched, circular, sinusoidal, oval, elliptical, coil, peanut shaped and other patterns. Suitable and preferred lay patterns and some of the methods and means for impressing or imposing such lay patterns upon a palladium surface are discussed in more detail in U.S. Published Application No. 2011-0232821, which is incorporated herein by reference. A cross-hatched abrasion pattern is preferred for surface activation in accordance with the present method.

The mean surface roughness or arithmetical mean height (Sa) is a known measurement for measuring the roughness of a surface and can be readily determined with the use of an optical profilometer. Any commercially available optical profilometer may be used. An example of such a commercially available optical profilometer is the ST400 3D Profilometer, which is marketed and sold by Nonovea.

Abrasives suitable for use in the abrading step to produce the desired surface roughness can be selected from any type of abrasive, such as, bonded abrasives, coated abrasives, and loose abrasives, including abrasive particles suspended in a liquid or abrasives contained in a paste. The size of the abrading particles should be such that they function to create a suitable abrasion pattern and to control the surface roughness in a defined range. Abrasion media having an average particle size of from 1 to 10 microns have been found to produce a suitable surface roughness. However, other abrasion media having an average particle size above or below this range can be used as long as they produce a final mean surface roughness (Sa) of above 0.8 microns up to 2.5 microns.

The composition of the abrasive particles is not critical, and the abrasive particles may be selected from the natural abrasives, such as, for example, diamond, corundum, emery, and silica, or from the manufactured abrasives, such as, for example, silicon carbide, aluminum oxide (fused, sintered, sol-gel sintered), boron carbide, and cubic boron nitride.

Following activation of the palladium surface by abrasion to the desired surface roughness and abrasion pattern, one or more layers of silver can be deposited on the palladium surface by any known means, including, for example, electroless plating, thermal deposition, chemical vapor deposition, electroplating, spray deposition, sputter coating, e-beam evaporation, ion beam evaporation and spray pyrolysis. A preferred deposition method is electroless plating.

The silver can be layered, i.e., deposited in multiple layers, or deposited in one layer. The silver can also be deposited on an intermetallic diffusion barrier and used to fasten the intermetallic diffusion barrier to the porous support, followed by additional silver plating steps. In another embodiment of the invention the silver layer may be sandwiched between layers of palladium. It is preferred that the palladium layer be plated last, i.e., after the final silver layer.

The amount of silver deposited may comprise from 1 wt % to 35 wt % of the total palladium layer(s). Preferably, the silver will comprise between 5 wt % and 30 wt % of the total palladium layer(s), more preferably between 10 wt % and 25 wt % of the total palladium layer(s).

The aforementioned percentages of silver can be applied in one or more plating operations. Generally the thickness of the silver overlayer will be less than 10 microns, preferably, less than 8 microns, and most preferably, less than 5 microns. The lower limit for the overlayer thickness is about 0.01 micron. Thus, the silver overlayer thickness can be in the range of between 0.01 micron and 10 microns, preferably, between 0.1 micron and 5 microns, and, most preferably, between 1 micron and 2 microns.

The total thickness of the combined palladium and silver layers should be less than 10 microns, preferably less than 8 microns, most preferably less than 6 microns.

In a preferred embodiment of the invention, the palladium-silver alloy gas separation membrane system is supported a porous substrate coated with an intermetallic diffusion barrier. In this embodiment, an intermetallic diffusion barrier is applied to a porous substrate; one or more layers of palladium or a palladium alloy is deposited on the intermetallic diffusion barrier; the surface of the palladium layer is activated by abrasion using an abrasive media to create a desired abrasion pattern and to control the surface roughness in a defined range; one or more layers of silver are then deposited, without chemical activation, on the abrasion activated palladium layer by contacting the activated palladium layer with a solution comprising a silver salt, such as silver nitrate. The silver layer(s) and the palladium layer(s) are heat treated, i.e., annealed, to produce the palladium-silver alloy gas separation membrane system.

In another embodiment of the invention, the silver layer is deposited first on the intermetallic diffusion barrier. The surface of the silver layer is then activated by abrasion, and one or more layers of palladium is/are then deposited over the silver layer, and the combined layers annealed.

Porous supports which may be employed in the various embodiments of the inventive method include any porous metal material that is suitable for use as a support for the intermetallic diffusion barrier and the layer(s) of palladium and/or palladium-silver alloy. The porous support may be of any shape or geometry; provided, that, it has a surface that permits the application thereto or deposition thereon of the intermetallic diffusion barrier and layer(s) of palladium, palladium alloys and silver. Such shapes can include planar or curvilinear sheets of the porous metal material having an undersurface and a top surface that together define a sheet thickness, or the shapes can be tubular, such as, for example, rectangular, square and circular tubular shapes that have an inside surface and an outside surface that together define a wall thickness and with the inside surface of the tubular shape defining a tubular conduit.

The porous metal material can be selected from any of the materials known to those skilled in the art including, but not limited to, the stainless steels, such as, for example, the 301, 304, 305, 316, 317, and 321 series of stainless steels, the HASTELLOY® alloys, for example, HASTELLOY® B-2, C-4, C-22, C-276, G-30, X and others, and the INCONEL® alloys, for example, INCONEL® alloy 600, 625, 690, and 718. The porous metal material, thus, can comprise an alloy that is hydrogen permeable and which comprises iron and chromium. The porous metal material may further comprise an additional alloy metal selected from the group consisting of nickel, manganese, molybdenum and any combination thereof.

One particularly desirable alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness as described above), porosity, and pore size distribution of the pores of the porous metal substrate are properties of the porous support selected in order to provide a gas separation membrane system of the invention that has the desired properties and as is required in the manufacture of the gas separation membrane system of the invention. It is understood that, as the thickness of the porous support increases, when it is used in hydrogen separation applications, the hydrogen flux will tend to decrease. The operating conditions, such as pressure, temperature and fluid stream composition, may also impact the hydrogen flux. But, in any event, it is desirable to use a porous support having a reasonably small thickness so as to provide for a high gas flux therethrough. The thickness of the porous substrate for the typical application contemplated hereunder can be in the range of from about 0.1 mm to about 25 mm, but, preferably, the thickness is in the range of from 1 mm to 15 mm, and, more preferably, from 2 mm to 12.5 mm, and, most preferably, from 2 mm to 10 mm.

The porosity of the porous metal substrate can be in the range of from 0.01 to about 1. The term porosity is defined as the proportion of non-solid volume to the total volume (i.e. non-solid and solid) of the porous metal substrate material. A more typical porosity is in the range of from 0.05 to 0.8, and, even, from 0.1 to 0.6.

The pore size distribution of the pores of the porous metal substrate can vary with the median pore diameter of the pores of the porous metal substrate material typically being in the range of from about 0.1 micron to about 50 microns. More typically, the median pore diameter of the pores of the porous metal substrate material is in the range of from 0.1 micron to 25 microns, and, most typically, from 0.1 micron to 7 microns.

As discussed above, the improved method of the invention also includes the application of an intermetallic diffusion barrier to the surface of the porous substrate, prior to forming thereon the layers of palladium, silver or palladium alloys. Suitable intermetallic diffusion barriers include particles of a material selected from the group consisting of inorganic oxides, refractory metals and noble metal eggshell catalyst. These particles are to be of the size so that they, or at least a portion of the particles, can fit, at least partially, within certain of the pores of the porous substrate used to support the palladium-silver membrane. Thus, they generally should have a maximum dimension of less than about 50 microns (μm).

The particle size (i.e., the maximum dimension of the particle) of the particles will, also, generally, depend on the pore size distribution of the pores of the porous substrate used in the inventive method. Typically, the median particle size of the particles of inorganic oxides, refractory metals or noble metal eggshell catalyst will be in the range of from 0.1 micron to 50 microns. More specifically, the median particle size is in the range of from 0.1 micron to 15 microns. It is preferred for the median particle size of the particles to be in the range of from 0.2 micron to 3 microns.

Examples of inorganic oxides that may suitably be used as the layer of intermetallic diffusion barrier particles include alumina, silica, zirconia, stabilized zirconias such as yttria or ceria stabilized zirconia, titania, ceria, silicon, carbide, chromium oxide, ceramic materials, and zeolites. The refractory metals may include tungsten, tantalum, rhenium, osmium, iridium, niobium, ruthenium, hafnium, zirconium, vanadium, chromium and molybdenum. As for the noble metal eggshell catalyst that may suitably be used as a layer of intermetallic diffusion barrier particles that is applied to the surface of the porous substrate, the noble metal eggshell catalyst is defined and described in great detail in U.S. Pat. No. 7,744,675, the entire text of which is incorporated herein by reference. A preferred intermetallic diffusion barrier for use in the inventive method is noble metal eggshell catalyst comprising zirconia stabilized with yttria, in particular zirconia stabilized with 6 to 8 wt % yttria. In some cases the addition of ceria has also been found to increase stabilization.

The layer of intermetallic diffusion barrier particles applied to the surface of the porous substrate to provide a coated substrate should be such as to cover the pores of the porous substrate and to provide a layer having a layer thickness that is greater than 0.01 micron, and, generally, in the range of from 0.01 micron to 25 microns. It is preferred for the layer thickness of the intermetallic diffusion barrier to be in the range of from 0.1 micron to 20 microns, and, most preferably, from 2 microns to 3 microns.

Following application of the intermetallic diffusion barrier to the porous substrate, one or more layers of a gas selective material, such as palladium or silver, can be deposited on the coated porous substrate using any suitable means or method known to those skilled in the art, such as, for instance, electroless plating, thermal deposition, chemical vapor deposition, electroplating, spray deposition, sputter coating, e-beam evaporation, ion beam evaporation and spray pyrolysis. A preferred deposition method for depositing palladium and/or silver on the coated porous substrate is electroless plating.

A gas-selective material, as the term is used herein, is a material that is selectively permeable to a gas when it is in a form of a dense, thin film, and, thus, a dense thin layer of such a material will function so as to selectively allow the passage of a selected gas therethrough while preventing passage of other gases. The preferred gas-selective metals used herein are palladium and silver and alloys thereof. Silver may also be used with palladium alloys of other metals.

The typical membrane thickness of the palladium membrane layer supported upon a porous support may be in the range of from 1 micron to 50 microns, but for many gas separation applications, a membrane thickness in the upper end of this range may be too thick to provide for a reasonable gas flux that allows for a desired gas separation. And, also, various of the prior art manufacturing methods often provide gas separation membrane systems having membrane layers of gas-selective material that are unacceptably thick such that they provide for unacceptable gas separation capability. Generally, a membrane thickness that is greater than 20 microns is too large to provide for acceptable separation of hydrogen from a gas stream, and, even a membrane thickness greater than 15 microns, is not desirable.

One of the advantages of the inventive method described herein is that it provides for the consistent manufacture of gas separation membrane systems that have evenly distributed silver layers on palladium layers supported upon a porous support. In particular, a dense palladium-silver alloy membrane can consistently be made to be 10 microns or less. Typically, a dense palladium-silver alloy membrane made by the inventive method has a thickness in the range of between 0.001 micron and 10 microns, preferably, between 0.01 micron and 8 microns, and, most preferably, between 0.1 micron and 6 microns.

As discussed above, generally when one attempts to deposit a layer of silver onto a layer of palladium that has not been activated, the silver deposits in the form of islands on the surface of the palladium, instead of an evenly distributed layer. This necessitates the deposition of numerous additional layers of palladium on the last silver layer in order to obtain a dense gas-tight membrane. The present method, which employs non-chemical surface activation, overcomes this problem and permits the formation of very thin, yet highly effective, palladium-silver gas separation membranes.

Any suitable means or method known to those skilled in the art may be used to deposit the silver overlayer upon the palladium membrane layer, including, for example, electroless plating, thermal deposition, chemical vapor deposition, electroplating, spray deposition, sputter coating, e-beam evaporation, ion beam evaporation and spray pyrolysis. A preferred deposition method for depositing the silver overlayer is electroless plating.

The annealing or heat treatment of the palladium layer(s), or the combined palladium-silver layers to form an alloy, may be suitably accomplished at a temperature between 400° C. and 800° C., preferably between 500° C. and 550° C. The annealing of the aforementioned layer(s) can be carried out in a hydrogen atmosphere or and inert gas such as nitrogen, argon or helium. In a preferred embodiment, the annealing is accomplished in an atmosphere of 100% hydrogen, or an atmosphere comprising a mixture of hydrogen and 3 wt % to 97 wt % of an inert gas selected from the group consisting of nitrogen, argon and helium.

Following deposition and annealing of the palladium layer(s), the surface of the palladium is then abraded to produce a mean surface roughness (Sa) within the ranges specified above, i.e., from above 0.8 micron to 2.5 microns, preferably between 0.85 micron and 1.5 microns and more preferably between 0.9 and 1.2 microns. It has been found that while it is generally desirable for the palladium surface on the coated porous substrate to be relatively smooth, i.e., within the controlled surface roughness range, it is important that the surface not be too smooth. If the surface of the palladium layer is highly polished of buffed, the silver will not evenly plate on the surface.

The inventive gas separation membrane may be used in the selective separation of a select gas from a gas mixture. The gas separation membrane is particularly useful in the separation of hydrogen from a hydrogen-containing gas stream, especially, in high temperature applications. One example of a high temperature application in which the inventive gas separation membrane may be used is in the steam reforming of a hydrocarbon, such as methane, to yield carbon monoxide and hydrogen, followed by the reaction of the yielded carbon monoxide with water in a so-called water-gas shift reaction to yield carbon dioxide and hydrogen. These catalytic reactions are equilibrium type reactions, and the inventive gas separation membrane is useful in the simultaneous separation of the yielded hydrogen while conducting the reactions in order to enhance the equilibrium conditions to favor hydrogen yield. The reaction conditions under which the reactions are simultaneously conducted can include a reaction temperature in the range of from 400° C. to 600° C. and a reaction pressure in the range of from 1 to 30 bars.

As already noted, the inventive gas separation membrane can be used in a wide variety of applications that involve the separation of hydrogen from gas streams that comprise other gases, for example, those selected from the group of gases consisting of carbon dioxide, water, methane or mixtures thereof. In such applications, the temperature conditions can be in the range upwardly to 600° C., for instance, in the range of from 100° C. to 600° C., and the pressure conditions can be in the range upwardly to 60 bar, for instance, in the range of from 1 to 60 bar.

The following examples are provided to further illustrate the invention, but they are, however, not to be construed as limiting its scope.

Example 1

This example illustrates the manufacture of a palladium and silver containing gas separation membrane system utilizing the inventive method which includes the deposition of one or more layers of silver on one or more layers of palladium deposited on a porous substrate which has been coated with an intermetallic diffusion barrier.

A slurry of noble metal eggshell catalyst comprising palladium and yttria stabilized zirconia was deposited on the surface of 1" OD×15" Inconel porous metal tube to form an intermetallic diffusion barrier having a thickness of 2-3 microns and attached by plating for 5 minutes under 5-8" Hg. Thereafter, a first film of palladium was deposited on the porous tube coated with the intermetallic diffusion barrier by circulating a palladium bath solution containing water, ammonium hydroxide, tetraamine palladium (II) chloride, disodium EDTA and hydrazine, over the surface of the coated porous tube until a first palladium layer having a thickness of 1-2 microns was obtained. The palladium layer was washed, dried, and annealed. The surface of the annealed palladium layers was then abraded, (i.e., cross-hatched) with 5 micron abrasive paper to provide a mean surface roughness (Sa) of between 0.85 micron and 2.5 microns. Thereafter the coated porous tube having the annealed, abraded palladium surface layer was plated with the first film of silver with a solution containing 651 ml 28-30% ammonium hydroxide solution per liter, 4.86 g silver nitrate ($AgNO_3$) per liter, 0.54 g tetraaminepalladium (II) chloride ($Pd(NH_3)_4Cl_2$), 33.6 g ethylenediaminetetraacetic acid disodium salt ($Na_2EDTA \cdot 2H_2O$) per liter, 2.9 ml of 1M hydrazine solution and sufficient deionized (DI) water to make 1 liter total volume, over the surface of the abraded palladium surface until a first silver layer was deposited. In addition, the composite membrane was rotated ¼ turn every 15 minutes. The temperature of the solution was 50° C. and the plating time 120 minutes. The plating, washing, drying, annealing and polishing steps were repeated to produce additional silver or palladium layers until the membrane was gas tight. The annealing temperature employed was about 500-550° C.

The porous tube having the annealed, abraded surface coated with silver or palladium is referred to herein as a "composite membrane".

Example 2

A 6 inch porous Inconel 625 support from Mott corp. was coated with an yttria stabilized zirconia intermetallic diffusion barrier and attached by pulling palladium plating solution through the support at 50° C. at 5-7 inches of Hg. This porous tube containing the intermetallic diffusion barrier was washed and dried before it was plated with the first plating step. The palladium and silver membrane was prepared in 7 plating steps. The metals were plated in the following order:
1) Palladium
2) Silver
3) Palladium
4) Silver
5) Palladium
6) Palladium
7) Palladium The palladium plating steps were carried out by circulating a palladium bath solution containing water, ammonium hydroxide, tetraamine palladium (II) chloride, disodium EDTA and hydrazine, over the surface of the coated porous tube until a first palladium layer having a thickness of 1-2 microns was obtained. The palladium layer was washed, dried, and annealed. The surface of the annealed palladium layer was then abraded, (i.e., cross-hatched) with abrasive papers to increase the surface roughness of the palladium layer to a mean surface roughness (Sa) of between 0.85 micron and 2.5 microns. Thereafter the coated porous tube having the annealed, abraded palladium surface layer was plated with the first film of silver layer with a silver bath solution containing ammonium hydroxide solution, silver nitrate ($AgNO_3$), tetraaminepalladium (II) chloride ($Pd(NH_3)_4Cl_2$), and ethylenediaminetetraacetic acid disodium salt ($Na_2EDTA.2H_2O$) along with 1M hydrazine solution over the surface of the abraded palladium surface until a first silver layer was deposited. In addition, the composite membrane was rotated ¼ turn every 15 minutes. The porous coated tube with the silver coated palladium layer was washed, dried, annealed and abraded, (i.e., cross-hatched) with abrasive papers to provide a mean surface roughness (Sa) of between 0.85 micron and 2.5 microns. The platings operations were repeated in the order given above.

The composition of the membrane was monitored by XRF (x-ray fluorescence) for composition and by optical profilometry for surface roughness, Sa. The chart below shows the values for the various operations. The final leak tight palladium/silver membrane contained 22 wt. % silver.

| Process step | Total thickness (µm) | Ag thickness (µm) | Pd thickness (µm) | Ag composition (%) | Sa (µm) |
|---|---|---|---|---|---|
| Post 1st abrading | — | — | — | — | 2.06 |
| Post 2nd plating (Ag) | 5.705 | 3.428 | 2.277 | 60 | 1.88 |
| Post 2nd anneal | 6.207 | 3.680 | 2.527 | 59 | — |
| Post 2nd abrading | 4.288 | 2.157 | 2.131 | 50 | — |
| Post 3rd plating (Pd) | 5.019 | 2.009 | 3.010 | 40 | — |
| Post 3rd anneal | 4.913 | 2.124 | 2.789 | 43 | — |
| Post 3rd abrading | 4.572 | 1.950 | 2.622 | 43 | 1.30 |
| Post 4th plating (Ag) | 5.564 | 3.038 | 2.526 | 55 | 1.15 |
| Post 4th anneal | 5.655 | 3.043 | 2.611 | 54 | — |
| Post 4th abrading | 5.315 | 2.759 | 2.556 | 52 | 1.51 |
| Post 5th plating (Pd) | 6.558 | 2.477 | 4.080 | 38 | — |
| Post 5th annealing | 6.405 | 2.672 | 3.733 | 42 | 1.12 |
| Post 5th abrading | 6.047 | 2.481 | 3.566 | 41 | 1.48 |
| Post 6th plating (Pd) | 8.726 | 2.079 | 6.647 | 24 | 1.01 |
| Post 6th annealing | 8.209 | 2.085 | 6.123 | 25 | 1.08 |
| Post 6th abrading | 7.851 | 2.184 | 5.667 | 28 | 1.14 |
| Post 7th plating (Pd) | 10.161 | 2.065 | 8.096 | 20 | 1.48 |
| Post 7th annealing | 9.792 | 2.156 | 7.636 | 22 | — |

While electroless plating of silver using a silver nitrate solution is usually accomplished with circulation of the plating solution, it has been found that when silver nitrate is used at the concentration employed in the plating solution used in Example 1, above, that deposition from the silver plating solution is not diffusion controlled. Therefore, circulation of the silver plating solution is not required, i.e., silver plating can be effectively accomplished in an electroless plating bath under relatively static conditions.

While this invention has been described with reference to preferred embodiments thereof, it will be understood by those skilled in the art that various modifications in form and detail may be made therein without departing from the scope of the invention set forth in the following claims.

What is claimed is:

1. A method of preparing a palladium-silver alloy gas separation membrane system, wherein said method comprises:
   providing a porous support upon which is supported a layer comprising palladium;
   activating the surface of said palladium layer by abrading said palladium layer with an abrasion media to impose an abrasion pattern and a mean surface roughness (Sa) above 0.8 micron up to 2.5 microns;
   depositing upon said activated palladium layer surface, without chemical activation, an overlayer comprising silver which is plated over the activated palladium layer surface, and;
   annealing at a temperature between 400° C. and 800° C. said palladium layer and silver overlayer.

2. The method as recited in claim 1, wherein the palladium layer is abraded to a mean surface roughness (Sa) in the range of from 0.85 micron to 1.5 microns prior to depositing said silver overlayer.

3. The method as recited in claim 1, wherein an intermetallic diffusion barrier is applied to the porous substrate and is positioned between the porous substrate and the palladium layer.

4. The method as recited in claim 1, wherein silver is deposited between layers of palladium, and the amount of silver deposited is between 1 wt % to 35 wt % of the total palladium layers.

5. The method as recited in claim 1, wherein the palladium layer is abraded with an abrasion media having a particle size of from 1 to 10 microns.

6. The method as recited in claim 1, wherein the silver overlayer which is deposited on the activated palladium layer has a thickness of between 0.01 micron and 10 microns.

7. The method as recited in claim 1, wherein a further palladium layer is deposited on said silver overlayer, after activation of the silver overlayer by abrasion to a surface roughness (Sa) above 0.8 micron to 2.5 microns.

8. The method as recited in claim 1, wherein the palladium layer is abraded to a mean surface roughness (Sa) in the range of from 0.9 micron and 1.2 microns prior to plating the silver overlayer.

9. The method as recited in claim 1, wherein the palladium-silver alloy membrane has a thickness of from 0.001 micron to 10 microns.

10. The method as recited in claim 3, wherein a layer of silver is deposited on the intermetallic diffusion barrier prior to depositing said layer of palladium.

11. The method as recited in claim 10, wherein the silver layer which is deposited on the intermetallic diffusion barrier is activated by abrasion to a mean surface roughness (Sa) between 0.85 micron and 1.5 microns prior to depositing of a palladium layer on said silver layer.

12. The method as recited in claim 1, wherein the silver overlayer which is deposited on the activated palladium layer has a thickness of between 1 micron and 2 microns.

13. The method as recited in claim 1, wherein the silver overlayer is deposited by electroless plating without circulation of the plating solution.

14. A palladium-silver alloy gas separation membrane system prepared by the method of claim 1.

15. A method for separating hydrogen from a hydrogen-containing gas mixture by passing said gas mixture through the palladium-silver alloy gas separation membrane system prepared by the method of claim 1.

* * * * *